Sept. 11, 1951  J. H. STRANGE ET AL  2,567,253
APPARATUS FOR PRESSURE MEASUREMENT
Filed May 9, 1945  2 Sheets-Sheet 1

INVENTORS
John H. Strange
BY Henry M. Grubb

Christie & Angus
ATTORNEYS

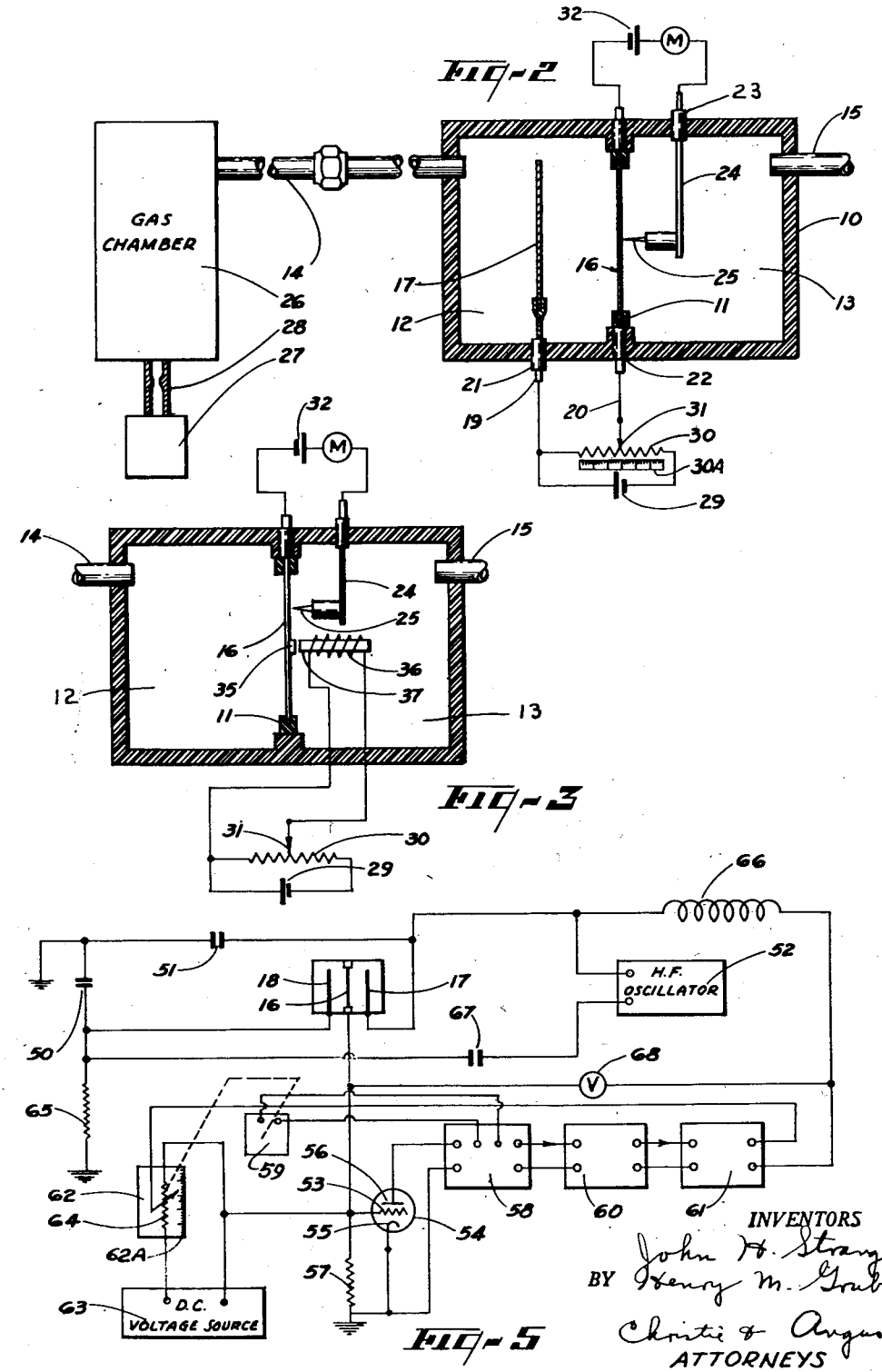

Patented Sept. 11, 1951

2,567,253

UNITED STATES PATENT OFFICE 2,567,253

APPARATUS FOR PRESSURE MEASUREMENT

John H. Strange, Hammond, and Henry M. Grubb, Highland, Ind., assignors to Standard Oil Company, Chicago, Ill., a corporation of Indiana Application May 9, 1945, Serial No. 592,830

10 Claims. (Cl. 73—398)

This invention relates to pressure gauges and particularly to gauges of the type adapted to measure low gas pressure.

The principal object is to provide a gauge suitable of measuring low pressures without the introduction of errors.

The gauge of our invention has a number of applications in low pressure work. It is especially applicable for measuring the pressure in a gas sample chamber of the type used for furnishing gas to the ionization chamber of a mass spectrometer. A mass spectrometer is a device for analyzing for the components of a gas. The gas is introduced into the ionization chamber of the spectrometer where ionization is produced, forming a number of ion beams depending on the gaseous constituents present. It is common practice to furnish the gas to be analyzed from a gas sample chamber through a capillary into the ionization chamber of the mass spectrometer; and it is desirable to measure the pressure in the sample chamber. In known types of gauges for making these measurements, for example, gauges of the resistance type, the pressure measurement varies somewhat with different gases which are present, and must accordingly be calibrated for the particular gas employed in order to obtain accurate measurement. The gauge of our invention has the advantage over the prior known types of gauges in that the pressure measurements are not dependent on the gases present in the chamber.

We carry out our invention by provision of a pair of chambers separated by a diaphragm. One of the chambers is connected with the chamber whose pressure is to be measured and the other of the chambers is maintained at a standard pressure by suitable high vacuum pumping equipment. The diaphragm will be deflected somewhat in one direction or the other, depending on whether the unknown pressure in the chamber connected to the vacuum system is greater or less than the reference pressure in the reference chamber.

A feature of our invention is the provision of electrical means acting on the diaphragm for bringing or maintaining the diaphragm in its neutral or undeflected position and then measuring the electrical force required to maintain this neutral position. The units of electrical force required for this are a measure of the unknown pressure.

Another feature of our invention is an electrical bridge-type of circuit in a system for actually measuring the electrical force which is employed.

The invention will be better understood from the following detailed description and the accompanying drawing of which:

Fig. 2 is a schematic view of the gauge shown in Fig. 1, together with a measuring circuit;

Fig. 3 shows a detail which may be used in the gauge of Fig. 1;

Fig. 5 shows a circuit adapted to be used with the gauge of Fig. 4.

Figure 1:
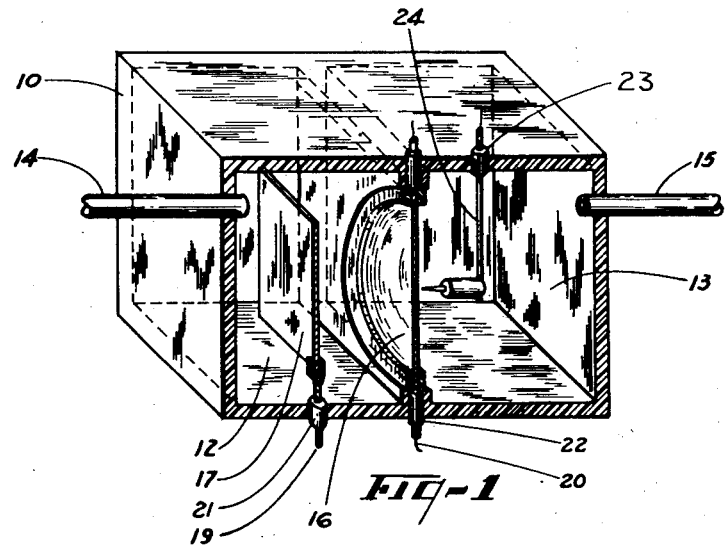
Fig. 1 is a perspective view of a gauge constructed in accordance with our invention, the gauge being shown partially in section.

The gauge in Figs. 1 and 2 comprises an enclosing casing or prism 10 having a partition 11 dividing the compartment into two chambers 12 and 13. There is led into chamber 12 an inlet tubing or conduit 14 and there is similarly led into chamber 13 a tubing or conduit 15. The partition 11 is provided with an opening or hole, shown circular in form in Fig. 1, in which there is placed a thin metal diaphragm or membrane 16, provided with a vacuum-tight seal where it joins the partition.

There is placed in the chamber 12 a metal plate 17, this plate being parallel to the diaphragm. The plate is held on a suitable metallic support 19, which is led through the casing 10 through vacuum-tight sleeve 21. A metal rod 20 is similarly led through a vacuum-tight sleeve 22, to make contact with diaphragm 16; and this may be done by connecting the rod 20 to partition 11, if the latter is of an electrical conducting material. There is led into chamber 13 through a vacuum-tight sleeve 23, an electrical conductor 24 having an electrical contact point 25 facing the diaphragm. The contact 25 is so positioned that it is spaced from the face of the diaphragm by the smallest gap that breaks the circuit of battery 32, when the diaphragm is in a normal or non-deflected position.

In operation, the reference chamber 13 is evacuated to a high degree by means of a suitable vacuum-pumping apparatus attached to the conduit 15 and maintained at that pressure as a standard reference pressure. The tube 14 is connected to the chamber 26, in which the pressure of gas is to be measured. This may for example, be the sample reservoir of a mass spectrometer 27. In operating such a mass spectrometer, the gas to be analyzed therein is commonly introduced from the sample reservoir 26, maintained at low pressure, into the ionization chamber of the spectrometer through a capillary 28; and it is desired to measure the pressure of the sample in the reservoir while the gas is being introduced.

The pressure at the sample reservoir, being higher than the reference pressure in chamber 13, will cause diaphragm 16 to bow into chamber 13 somewhat, and into contact with contact point 25.

To measure the pressure in chamber 12, we apply to the condensed plates 16 and 17 a D. C. voltage from a voltage source 29. This voltage should be adjustable and for this purpose a potentiometer 30, having an adjustable tap 31, is connected across the voltage 29. The tap 31 may be moved along the potentiometer until diaphragm 16 is brought out of contact with point 25 owing to the force of the electro-static field set up between plates 16 and 17. The instant when the contact is broken may be indicated by a meter M in series with a battery 32, connected between the diaphragm 16 and electrode 24, as shown. The potentiometer is provided with a scale 30A which may be calibrated in terms of pressure, so that it may be made to read directly the pressure in chamber 12 which will be that in the gas reservoir 26.

Fig. 3 shows a detail which may be used as an alternative to the electro-static plate arrangement shown in Fig. 1. In Fig. 3, the diaphragm 16 has cemented to its surface a member 35 of magnetic material and there is provided in chamber 13 an electro-magnet 36 with a magnetic core 37. The coil of magnet 36 is connected to the potentiometer 30 and movement of tap 31 will vary the magnetizing force of the magnet. The diaphragm 16 may accordingly be brought to a neutral position in contact with point 25 by adjusting tap 31 to produce sufficient magnetizing force for this purpose. In using this device, the difference in gas pressures between the two chambers is arranged so that the diaphragm bows into chamber 12. It may then be pulled into the neutral position by the magnet.

Figure 4:
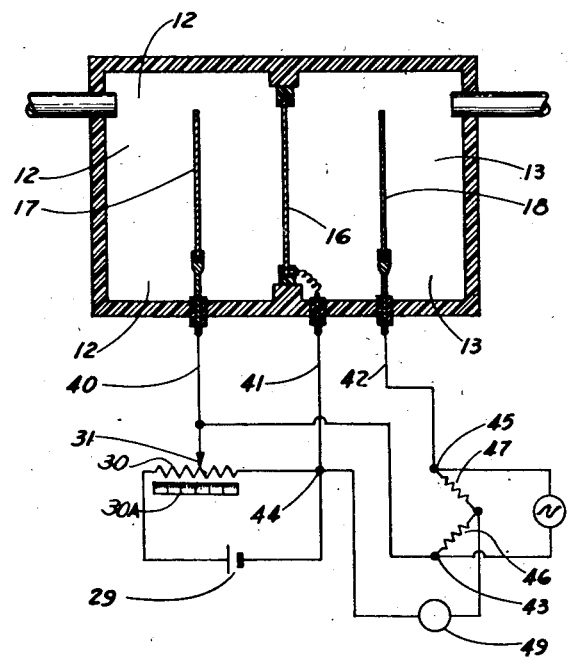
Fig. 4 is a sectional view of another form of gauge according to our invention.

Fig. 4 shows a further modification of our invention which avoids the use of a contact 25 to determine the centering of the diaphragm. In this arrangement leads 40 and 42 are brought out from the electro-static plates 17 and 18, and lead 41 is brought out from diaphragm 16. Plate 18 is arranged in chamber 13 in a manner similar to the arrangement of plate 17 in chamber 12. The restoring force on the diaphragm is effected by use of the D. C. voltage on potentiometer 30, connected between one lead 40 and lead 42. Potentiometer 30 may be provided with a scale 30A which is conveniently calibrated in terms of pressure. The centering of the diaphragm is indicated by connecting terminals 43, 44 and 45 from the elements in a bridge circuit with a pair of equal impedances 46 and 47 as shown, and applying a source of alternating voltage across the conjugate terminals of the bridge. When the bridge balances, as indicated by the meter 49, the capacities between the diaphragm and each of electro-static plates 17 and 18 are equal, indicating the centering of the diaphragm.

Fig. 5 shows an electrical system especially well suited for use with the gauge of the type shown in Fig. 4. In Fig. 5, the plates 17 and 18 are shown as a pair of condensers on either side of the diaphragm 16; and the condensers 16—17 and 16—18 are connected in a capacity bridge with the other two condensers 50 and 51. Alternating voltage is applied across the opposite input terminals at the bridge from a high frequency oscillator 52. One output terminal on the bridge is grounded and the other output terminal of the bridge is the diaphragm 16 which is connected to the grid 53 of a vacuum tube 54, this tube being of the three-electrode type, having a cathode 55 and an anode 56. The grid 53 and the cathode 55 are both connected to ground, the grid being grounded through a grid leak 57. The output circuit of tube 54 is connected to the input of an amplifier 58, the output of which is connected to the blocked grid of a blocked grid amplifier 60. The output of amplifier 60 controls a voltage supply 61 which in turn is connected through a coke coil 66 to condenser plate 17. Amplifier 60 is adjusted to function only when diaphragm 16 is slightly displaced, that is, not until the signal voltage reaching amplifier 60 from amplifier 58 exceeds a predetermined value. Amplifier 60 then causes power supply 61 to produce a D. C. output voltage sufficiently great to prevent appreciable further deflection of diaphragm 16. For adequate protection of the diaphragm rapid response of amplifier 60 and power supply 61 is essential. Amplifier 58 simultaneously powers a servomotor 59 which adjusts tap 64 of divider 62, which is supplied from voltage source 63. Automatic adjustment continues until the voltage supplied by divider 62 brings the capacity bridge in balance by restoring diaphragm 16 to its original position. It is to be noted that the balance so attained is correct, since the D. C. voltage from power supply 61 becomes zero appreciably before final balance is attained.

In order to keep the D. C. adjustment circuit and the HF signal circuit apart there is provided, besides the choke 66, a blocking condenser 67. There is also provided a resistor 65 matching resistor 57 connected to one-half of the bridge and grounded so as to prevent the condensers in the bridge from building up a charge. To complete the circuit a voltmeter 68 for indicating the D. C. required to balance the bridge is connected across the D. C. output.

It is seen that by this circuit the rapid establishment of D. C. voltage by amplifier 60 and power supply 61 prevents excessive distortion of the diaphragm, lessening hysteresis effects in the diaphragm and making it feasible to use a more sensitive diaphragm, and thus serves as a protective device. The slower-acting servomotor and circuit returns the diaphragm to its undisturbed position, being unaffected at the final balance point by amplifier 60 or power supply 61. At the balance point, the effect of the elastic constants of the diaphragm is essentially eliminated as a factor in the indicated pressure. This is a distinct advantage over previous types of diaphragm gauges.

The capacity bridge is designed so that it balances when the diaphragm is centered; and the bridge, together with the rest of the circuit is self-balancing. The balance is brought about by such unbalance oscillating voltage as is impressed on the grid of amplifier 54. This is amplified in the amplifier 58, which in turn drives the servomotor 59 until enough D. C. voltage is applied by means of the adjustable potentiometer 62 until the D. C. voltage on the diaphragm centers it, thereby producing the balance which stops the motor. The exact centering is brought about by operation of the blocked grid amplifier which fires when the diaphragm is almost centered. The potentiometer 62 is provided with a scale 62A for convenience in determining the magnitude of the electrostatic field required to center the diaphragm. If desired the scale 62A may be calibrated directly in terms of pressure.

We claim:

1. A gauge for measuring low pressure in an enclosure, said gauge comprising two compartments separated by a diaphragm, an electrical conducting plate in the first of the compartments facing the diaphragm, the second of said compartments being adapted to be evacuated to a known degree of pressure, means for connecting the first compartment to the enclosure, means including said electrical conducting plate to apply an electrostatic field to said diaphragm, whereby said diaphragm may be centered, means for indicating when said diaphragm is centered and measuring means for determining the magnitude of said electrostatic field required to center said diaphragm.

2. A gauge for measuring low pressure in an enclosure, said gauge comprising a pair of compartments separated by a partition, a metallic diaphragm forming part of the partition, a metallic plate in each compartment facing the diaphragm and each plate forming with the diaphragm an electrical condenser, both of the condensers being of equal capacity when the diaphragm is centered, one of the compartments being adapted to be evacuated to a known reference pressure, means for connecting the enclosure to the other compartment, means including one of said plates to apply an electrostatic field to said diaphragm whereby said diaphragm is centered, means for indicating when said diaphragm is centered involving means for determining the point of equilibrium between the condensers formed by said diaphragm and each of said plates and means for measuring the magnitude of the electrostatic field necessary to accomplish the centering of said diaphragm.

3. A gauge for measuring low pressure in an enclosure, said gauge comprising two compartments separated by an electrical-conducting diaphragm, an electrical-conducting plate in each compartment in spaced relation with the diaphragm, one of the compartments being adapted to be evacuated to a known degree of pressure, means for connecting the other compartment to the enclosure, an adjustable electrical voltage connected between the diaphragm and one of said plates for centering the diaphragm by adjustment of said voltage, measuring means for indicating when the capacities between the diaphragm and each plate are equal, and an indicator for indicating the voltage required to center the diaphragm so that said capacities are equal.

4. Apparatus according to claim 3, in which the electrical means is a four-arm capacity bridge of which the said capacities between the diaphragm and the respective plates are in adjacent arms.

5. A gauge for measuring low pressure in an enclosure, said gauge comprising two compartments separated by a partition, a metallic diaphragm forming a part of said partition, means for connecting the first of said compartments to said enclosure, means for connecting the second of said compartments to an evacuating means whereby the second of said compartments may be evacuated to a known degree of pressure, a metallic conducting plate positioned in each compartment facing the said diaphragm, means including one of said conducting plates for applying an electrostatic field to said diaphragm whereby a force may be applied thereto substantially equal and opposite to that existing as a result of the pressure differential between the said two compartments, means for indicating when the said diaphragm is centered which comprises means for ascertaining the equilibrium between the condensers formed by said diaphragm and each of said metallic plates, and indicating means for measuring the magnitude of the electrostatic field required to center said diaphragm.

6. A gauge according to claim 1 in which the said means for indicating when the diaphragm is centered comprises an electrical contact in juxtaposition thereto, said contact being in circuit with a source of voltage and an indicator to indicate when the said contact is engaged by said diaphragm.

7. A gauge for measuring low pressure within an enclosure, said gauge comprising two compartments separated by a diaphragm, means for connecting the first of said compartments with said enclosure, means for connecting the second of said compartments to an evacuating means whereby said second of said compartments may be evacuated to a known degree of pressure, electrical contacting means located in one of said compartments and adapted by making contact with said diaphragm to indicate the relative position thereof, an electromagnet located in one of said compartments and connected with an energizing source located without said compartments, said electromagnet being adapted to exert a force on said diaphragm substantially equal and opposite to the force exerted thereon by any pressure differential existing between said first and said second compartments, said diaphragm incorporating magnetic material, and means for measuring the energy required by said electromagnet to exert said substantially equal and opposite force.

8. A gauge for measuring low pressure in an enclosure, said gauge comprising two compartments separated by a partition, a metallic diaphragm forming a part of said partition, means for connecting the first of said compartments to said enclosure, means for connecting the second of said compartments to an evacuating means whereby said second of said compartments may be evacuated to a known degree of pressure, a metallic conducting plate positioned in each compartment facing the said diaphragm, means including one of said conducting plates for applying an electrostatic field to said diaphragm whereby a force may be applied thereto substantially equal and opposite to that existing as a result of a pressure differential between the said two compartments, means including the other of said plates for indicating when the diaphragm is distorted by a pressure differential, said last named means including means for detecting changes in the capacitance between said other of said plates and the diaphragm, and indicating means for measuring the magnitude of the electrostatic field required to center said diaphragm.

9. A gauge for measuring low pressure in an enclosure, said gauge comprising two enclosed compartments separated by a partition, a metallic diaphragm forming a part of said partition, means for connecting the first of said compartments to said enclosure, means for connecting the second of said compartments to an evacuating means whereby the pressure in said compartment may be adjusted to a known degree of pressure, a metallic conducting plate positioned in each compartment facing the said diaphragm, means including one of said conducting plates for applying an electrostatic field to said diaphragm whereby a force may be applied thereto substantially equal and opposite to that existing as a result of a pressure differential between the said two compartments, means including the other of said plates for indicating when the diaphragm is distorted by a pressure differential, said last named means including means for detecting changes in the capacitance between said other of said plates and the diaphragm, indicating means for measuring the magnitude of the electrostatic field required to center said diaphragm, and means for applying the last mentioned capacitance change to control the magnitude of the electrostatic field applied to said diaphragm.

10. A gauge for measuring pressure in an enclosure, comprising two compartments separated by a diaphragm, means for connecting the first of said compartments with said enclosure, means for connecting the second compartment with an evacuating means whereby the pressure in the second compartment may be adjusted to a known value, means for maintaining said diaphragm at null or centered position including electrical means spaced from but adjacent said diaphragm for establishing in the region of said diaphragm a field adapted to exert force on the diaphragm, said diaphragm including metallic material responsive to the force exerted by said field, means cooperating with said diaphragm for detecting when the same is distorted from its null position, means for adjusting the field to exert a restoring force on the diaphragm to return it to its null position, and means for measuring the energy required to maintain a field of sufficient strength to maintain the diaphragm in null position as a measure of the pressure in the enclosure.

JOHN H. STRANGE.
HENRY M. GRUBB.

REFERENCES CITED

The following references are of record in the file of this patent:

UNITED STATES PATENTS

| Number | Name | Date |
|---|---|---|
| 1,137,945 | Allen | May 4, 1915 |
| 1,692,513 | Newell | Nov. 20, 1928 |
| 1,822,184 | Wunsch | Sept. 8, 1931 |
| 2,151,941 | Rydberg | Mar. 28, 1939 |
| 2,319,363 | Wunsch et al. | May 18, 1943 |
| 2,368,278 | Warshaw | Jan. 30, 1945 |
| 2,388,542 | Hobbs | Nov. 6, 1945 |